United States Patent [19]

Kessler

[11] Patent Number: 4,616,132
[45] Date of Patent: Oct. 7, 1986

[54] SYNCHRONIZATION APPARATUS FOR SCANNER

[75] Inventor: David Kessler, Rochester, N.Y.

[73] Assignee: Eastman Kodak Company, Rochester, N.Y.

[21] Appl. No.: 614,501

[22] Filed: May 29, 1984

[51] Int. Cl.⁴ .............................................. H01J 3/14
[52] U.S. Cl. ............................ 250/236; 250/237 R; 358/293
[58] Field of Search ........... 250/234, 235, 236, 237 R; 358/293; 350/6.7

[56] References Cited

U.S. PATENT DOCUMENTS

| | | | |
|---|---|---|---|
| 3,573,849 | 4/1971 | Herriot | 346/108 |
| 3,835,249 | 9/1974 | Dattilo et al. | 178/7.6 |
| 4,279,472 | 7/1981 | Street | 250/235 |
| 4,429,220 | 1/1984 | Noguchi | 250/236 |

Primary Examiner—David C. Nelms
Assistant Examiner—James G. Gatto
Attorney, Agent, or Firm—Donald D. Schaper

[57] ABSTRACT

Apparatus is disclosed for producing clock signals which are used to precisely control the modulation of a first light beam as it is line scanned by a moving mirror. The apparatus employs a second beam of light which is reflected from the moving mirror and is intensity modulated by a grating. A paraboloid mirror receives such intensity modulated second beam and reflects a collimated beam. A lens focuses such collimated beam to form a stationary image on the surface of a detector which produces the clock signals.

4 Claims, 1 Drawing Figure

U.S. Patent  Oct. 7, 1986  4,616,132
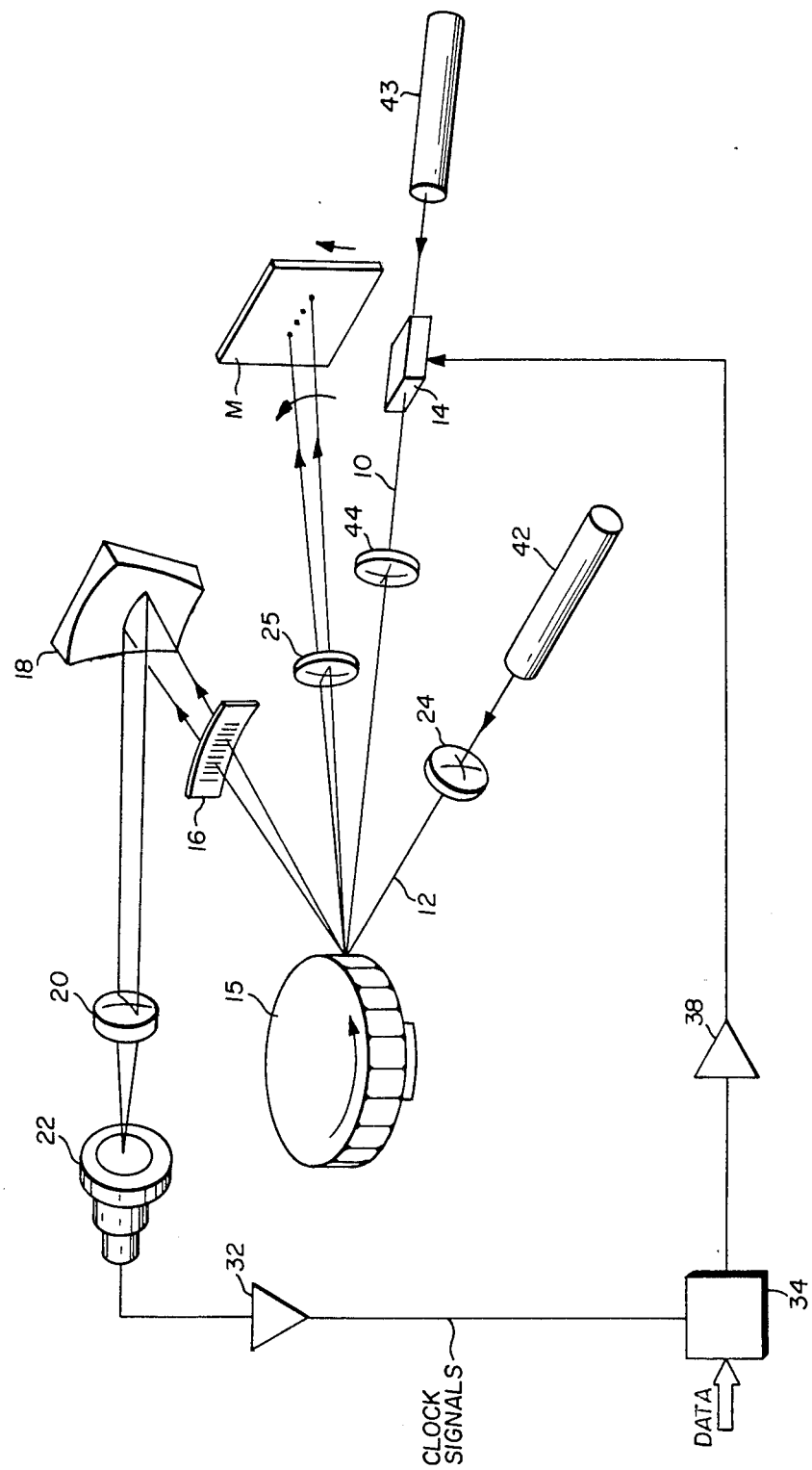

SYNCHRONIZATION APPARATUS FOR SCANNER

FIELD OF THE INVENTION

This invention relates to apparatus for precisely controlling the modulation of a laser beam as it is line scanned.

BACKGROUND OF THE INVENTION

Optical printing systems use output scanner systems wherein the intensity of a laser light beam focused on a moving two-dimensional photosensitive surface is modulated as the beam is line scanned relative to such moving surface to provide a two-dimensional output image. In one common output scanner system, a deflector, such as a rotating polygon mirror, line scans a beam of laser light. The intensity of such scanned light beam is modulated by an acoustooptic cell. Precise synchronization clock signals are necessary to represent the position of the laser beam as it is line scanned. The timing of the modulation of the laser beam is controlled by these clock signals. The clock signals control the flow of information from an electronic data buffer to the modulator. One common technique used to provide clock signals is a grating clock. In this technique, a second unmodulated beam is also reflected off the rotating mirror surface and scans a grating that intensity modulates the second light beam. A mirror projects the intensity modulated second light beam onto the surface of a detector which provides the synchronization clock signals as the line scan progresses. This system offers a number of advantages in that the clock signals produced are representative of the instantaneous beam position. U.S. Pat. No. 3,835,249 to Dattilo et al, issued Sept. 10, 1974, discloses such a system. One problem with prior arrangements is that the light image formed on the photodetector surface will move or wobble as the second light beam is line scanned. Since the photosensitivity of the detector surface may change from position to position, the modulated moving light image may interlace noise into the clock signals.

SUMMARY OF THE INVENTION

The object of this invention is to provide relatively noiseless clock signals for use in synchronizing the modulation of a first light beam as it is line scanned.

This object is achieved by an apparatus which uses a laser light beam intensity modulated by a grating and a paraboloid mirror which receives such intensity modulated beam and projects it as a collimated beam. A lens focuses the collimated beam, as a stationary image, onto the surface of the detector. The detector produces the clock pulses.

In order for the grating to sharply modulate the light beam, the light beam is shaped so as to have its waist at the surface of the grating. As the light beam is scanned, the instantaneous positions of the light beam waists locus describe a curve. The grating is curved so that its curvature matches such curve.

BRIEF DESCRIPTION OF THE DRAWING

The drawing shows a simplified top plan view depicting an output polygon scanner and an apparatus for producing synchronization clock signals.

DESCRIPTION OF THE PREFERRED EMBODIMENTS

As shown in the drawing, a first laser light beam 10 from laser 43 which is modulated by an acoustooptical modulator 14 and shaped by lens 44, is reflected off a mirrored facet of a rotating polygon 15 through optical element 25 and line scanned onto a photosensitive member M. The photosensitive member M is moved in a direction perpendicular to the line scan by means not shown to provide a two-dimensional image. Clock signals are needed to control the operation of modulator 14 in accordance with the position of the beam 10 in the line scan.

A second unmodulated laser beam 12 from laser 42, or split off laser 43, is focused by lens 24 on a curved grating 16 after being reflected off a mirrored facet of the polygon 15. To reduce the tolerance for facet power variations and other deformations in the facets, the second light beam 12 is generally in coincidence with the first light beam 10 at a polygon facet but at a different intersection angle than the first light beam. Lens 24 forms a beam waist of beam 12 at the grating 16. The grating 16 is located along the path of the second light beam 12 between the polygon 15 and a paraboloid mirror 18. Grating 16 is curved so that its curvature matches the locus of the scanned waist positions. As beam 12 is scanned, light passes through the grating. The grating thereby intensity modulates the scanned beam 12. The scanned beam 12 is then reflected off the paraboloid mirror 18 which has its focal point at or in the vicinity of the intersection of beam 12 and a polygon facet. The paraboloid mirror 18 receives the beam at an off axis position, e.g. a position spaced from the position where the paraboloid axis would engage the paraboloid surface. Because the beam 12 passes in the vicinity of the focal point of the paraboloid and is received by the paraboloid at an off-axis position, the paraboloid mirror collimates the scanned beam 12 which is then collected and focused by a lens 20 onto the surface of detector 22. The detector surface and the facet are cojugate to provide a stationary image on the detector surface thereby eliminating beam wobbling on the detector surface. The detector 22 produces relatively noiseless clock signals in response to the modulation of the stationary image and inputs them to an amplifier 32. Clock signals from amplifier 32 gates data from the storage buffer 34 to a power amplifier 38. It will be understood that the storage buffer 34 includes a conventional digital-to-analog converter (not shown). The storage buffer receives digital data representative of the information to be recorded on the member M from an information source not shown. The amplifier 38 provides driving analog signals to the acoustooptical modulator 14 in the usual manner. The acoustooptic modulator creates a diffraction grating that causes a first-order beam to be diffracted out of the original beam. Beam 10 is actually the first-order beam. Beam 10 is information-wise modulated in accordance with the data delivered from the buffer 34.

The invention has been described in detail with particular reference to a preferred embodiment thereof, but it will be understood that variations and modifications can be effected within the spirit and scope of the invention.

I claim:

1. Apparatus for producing clock signals in a scanner having means for modulating a first beam and means for projecting the beam onto a moving reflective surface which scans the beam through a plurality of positions, said apparatus being adapted to synchronize the position of said beam with the modulation thereof, said apparatus comprising:
  (a) means for projecting a second light beam onto said moving reflective surface;
  (b) an optical grating, positioned to intercept said second light beam from said surface, for intensity modulating said second light beam;
  (c) a paraboloid mirror, disposed to receive said second beam from said grating, for collimating said second light beam;
  (d) lens means, positioned to receive said second light beam from said mirror, for focusing the second light beam at a plane to form a stationary image; and
  (e) detector means, positioned in said plane to receive the stationary image, for producing clock signals in response to the intensity modulation of said second beam.

2. Apparatus, as defined in claim 1, wherein said grating has a curved surface, and said means for projecting a second light beam includes an optical means which forms a beam waist of said second light beam on said curved surface.

3. Apparatus for producing clock signals in a scanner having means for modulating a first light beam and means for directing the beam onto a facet of a polygon which scans the beam onto a receiving member, said apparatus comprising:
  (a) means for projecting a second light beam onto the facet of said polygon which scans said second light beam through a plurality of positions, said projecting means including optical means which combines with said facet to form a waist of said second light beam in each of said positions to define a locus of waist locations;
  (b) an optical grating positioned to intercept said second light beam from said facet for intensity modulating said second light beam, said grating having a curvature defined by said locus;
  (c) a mirror, disposed to receive said second beam from said grating, for collimating said second light beam;
  (d) lens means, positioned to receive said second light beam from said mirror, for focusing the second light beam at a plane to form a stationary image; and
  (e) a detector, positioned with a surface in said plane, for producing clock signals in response to the intensity modulation of said second light beam.

4. Apparatus, as defined in claim 3, wherein said mirror is a paraboloid.

* * * * *